Figure 1:
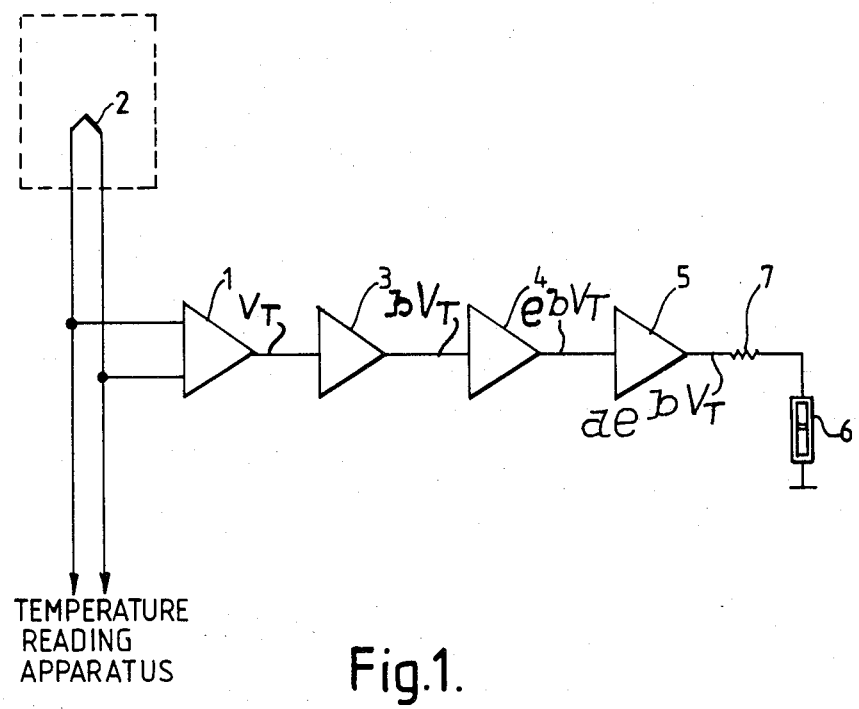

United States Patent [19]
Benedek et al.

[11] Patent Number: 4,721,942
[45] Date of Patent: Jan. 26, 1988

[54] CALIBRATION WARNING APPARATUS

[76] Inventors: Robin A. Benedek, 75 Woodstock Road, Bedford Park, Chiswick, London, W4 1EE; Ralph G. Hollister, 46 The Warren, Chartridge, Near Chesham, Buckinghamshire, both of England

[21] Appl. No.: 588,033

[22] Filed: Mar. 9, 1984

[30] Foreign Application Priority Data

Mar. 11, 1983 [GB] United Kingdom ............... 8306764

[51] Int. Cl.⁴ .................. G08B 21/00; G04F 10/10; G01R 35/04
[52] U.S. Cl. .................. 340/309.15; 324/74; 340/588; 340/653; 368/114; 374/104
[58] Field of Search ........... 374/1, 170, 142, 174, 374/153; 324/459, 74, 98; 364/800; 340/309.3; 368/114, 121

[56] References Cited

U.S. PATENT DOCUMENTS

| | | | |
|---|---|---|---|
| Re. 24,190 | 7/1956 | Kroko | 368/114 |
| Re. 27,556 | 1/1973 | Corrsin | 368/114 |
| 2,945,179 | 7/1960 | Winn | 368/114 |
| 3,177,718 | 4/1965 | Stevenson | 374/142 |
| 3,355,731 | 11/1967 | Jones, Jr. | 368/114 X |
| 3,518,501 | 6/1970 | Bissett et al. | 368/114 X |
| 3,619,615 | 11/1971 | Moss | 324/459 X |
| 3,624,525 | 11/1971 | Smith | 328/3 |
| 3,753,131 | 8/1973 | Kramer | 328/145 |
| 3,810,163 | 5/1974 | Arnold et al. | 340/501 X |
| 3,877,307 | 4/1975 | Georgi | 374/170 |
| 3,882,481 | 5/1975 | Turner | 374/142 |
| 3,921,453 | 11/1975 | Platzer, Jr. | 340/501 X |
| 3,938,128 | 2/1976 | Pidsasny et al. | 368/114 X |
| 3,992,668 | 11/1976 | Finger | 374/179 X |
| 4,100,490 | 7/1978 | Peck et al. | 324/94 X |
| 4,211,113 | 7/1980 | Harrison | 374/170 |
| 4,218,916 | 8/1980 | Mutziger | 374/170 |
| 4,261,762 | 4/1981 | King | 250/443.1 |

FOREIGN PATENT DOCUMENTS 2852570  6/1979  Fed. Rep. of Germany .......... 374/1

OTHER PUBLICATIONS

RS Components Catalog; Mar.–Jun. 1985; "Semiconductors 279"; (Quarndon El.); 6 pages.

Primary Examiner—Daniel M. Yasich
Attorney, Agent, or Firm—Cushman, Darby & CUshman

[57] ABSTRACT

A circuit for indicating when recalibration of an electrical sensor is necessary includes an analog driving circuit adapted to be coupled to the sensor, and an analog indicating device coupled to the analog driving circuit for indicating when the sensor should be recalibrated. The analog driving circuit provides a signal proportional to the current received from the electrical circuit. The indicating device is responsive to the output from the analog driving circuit and provides an output which is a function of both the sensor output and the elapsed time that the sensor has been operated.

19 Claims, 2 Drawing Figures

CALIBRATION WARNING APPARATUS

This invention relates to apparatus for use with a measuring or reference device, the apparatus providing a calibration warning in response to extended use of the device. The invention is primarily intended for use with a thermocouple operating at high or constant temperatures.

It has been found that when a thermocouple is installed in, for example, a furnace, its electrical output relative to temperature will drift gradually from an initial calibrated condition depending on the length of time the element is exposed to elevated temperatures and the magnitude of those temperatures. In the past, replacement of thermocouples has been carried out at regular time intervals loosely based on previous experience or, in the case of a furnace, when a batch of material has been ruined due to the thermocouple drifting outside heat treatment temperature limits. It is known to obtain a thermocouple calibration warning from a computer connected to a number of thermocouples by programming the computer to build up a digital calibration count for each thermocouple based on the number of heating cycles to which the thermocouple has been subjected and the maximum temperature reached in each cycle. A disadvantage of this known system is that, although it can provide a defined method of predicting a predetermined calibration drift, it requires the use of a computer and interfacing circuits. It is an object of the present invention to provide calibration warning apparatus that is relatively simple and more suitable for use with a single thermocouple.

According to one aspect of this invention a calibration warning apparatus for use with an electrical sensor comprises an analogue indicating device coupled to an analogue driving circuit, the circuit being responsive to the output of the sensor such that the reading provided by the indicating device is a function both of the sensor output and elapsed time. According to another aspect to the invention a calibration warning apparatus for use with a sensor or electrical reference device comprises an indicating device coupled to an analogue driving circuit arranged to provide an indicator reading which is a function both of the temperature at which the sensor or reference device is operated and the total time the sensor or reference device has been used.

Figure 2:
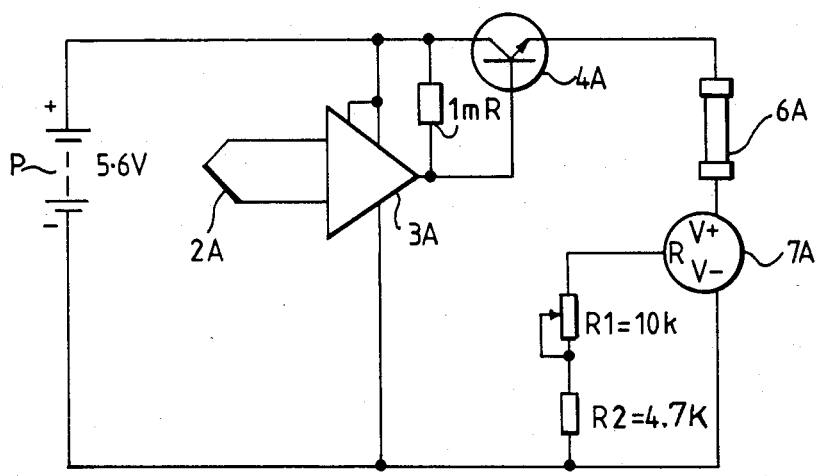

Two embodiments of the invention will now be described by way of example with reference to the accompanying drawings in which;

FIG. 1 is a circuit diagram of a warning module which is connected to a thermocouple; and FIG. 2 is a circuit diagram of a warning module which may be connected to a thermocouple operated at substantially constant temperature.

Referring to FIG. 1, the module has a high input impedance unity gain buffer amplifier 1 coupled to a single high temperature thermocouple 2, and an amplifier chain 3, 4, 5 having both linear and exponential gain or attenuation characteristics for generating an output current $I_o$ which is dependent on the thermocouple voltage $V_T$ according to the relationship $$I_o = ae^{bV}T$$

This current is fed to a known elapsed time indicator 6, such as the type having a drop of electrolyte separating two columns of mercury in a glass tube. Such indicators are relatively inexpensive and compact. As direct current passes from one column of mercury to the other through the electrolyte, mercury ions migrate from one column to the other, so moving the electrolyte drop along the tube in proportion to the current and elapsed time that is the total electrical charge current transmitted since the indicator was installed.

The gain relationship $I_o = ae^{bV}T$ is obtained by firstly amplifying the output voltage $V_T$ of the buffer 1 by a factor of b (a constant) in a linear amplifier 3, feeding the amplified voltage $bV_T$ to an amplifier 4 having an exponential characteristic to yield an output $e^{bV}T$, and then amplifying the signal again with an amplifier 5 having a constant gain a to provide an output current $I_o = ae^{bV}T$ through a ballast resistance 7 and the elapsed time indicator 6. Thus, the output from amplifier 4 is a signal exponentially related to the sensor output. The output current $I_o$ is thus a signal proportional to the exponential gain derived from amplifier 4. The ballast resistor 7 serves to reduce to an insignificant level, any minor variation in the impedance of the elapsed time indicator.

It will be seen that the output current $I_o$ is increased exponentially with $V_T$, so that the rate at which the indicator reading changes is a function of the rate of drift in the thermocouple calibration, such drift being higher at relatively high temperatures.

The constants a and b can be altered by changing the value of the resistance 7 or the gain of the amplifiers to suit the drift characteristics of the thermocouple type, so that the indicator 6 reaches the end of its scale when the thermocouple is judged to be due for replacement or re-calibration.

Other devices for determining and/or responding to the total quantity of electrical charge current passing through the resistor 7 in a given time may be used in place of or in addition to the indicator 6. A device of this type, or the indicator 6 could be such or be so modified that visual and/or audible warnings are given when a predetermined threshold value of the charge current passing through the resistor 7 is reached.

C-Mos operational amplifiers are preferred to ensure that current usage from the batteries is such as to yield a useful life of at least one year. Examples of suitable devices are an ICL 7611 DCPA and TLC 251 both of which have the required high input impedance (>10 ohms) and adjustable quiescent currents settable down to 10 µA.

The present invention is also applicable to so-called "profiling" thermocouples (thermocouples which provide a profile of temperature over a given distance such as a furnace length) which are used predominantly in the semiconductor industry where accurate temperature measurement is essential and which generally operate at a single predetermined temperature. For such thermocouples, one of the linear amplification stages and the exponential stage could be eliminated at the expense of obtaining a reasonably accurate warning only within a narrow temperature band of the set temperature typically at ±25° C. The warning module is, in this application connected to one of the thermocouples comprising the profiling thermocouple.

In the above, reference has been made to an exponential equation but it will be understood that other equations for example, a polynominal, of the general form $I_o = f(t_\epsilon)$ or $I_o = f(T, t_\epsilon)$ can be applied; where $t_\epsilon$ is the time elapsed and T is the temperature at which the thermocouple operated during that time.

FIG. 2 is a circuit diagram of a warning module for use with a thermocouple which is operated at a substantially constant temperature. Circuit component reference designations are taken from the "Radio Spares Catalogue" and specific values are given by way of example. The module of FIG. 2 includes an elapsed time indicator 6A which may, as in the case of the warning module of FIG. 1, be a mercury indicator.

The circuit of FIG. 2 is, in essence, a pre-settable clock and is caused to operate whenever input from a thermocouple 2A (reference TLCICP) exceeds, say 2 mV. The thermocouple is connected as shown in circuit with a power source P, an amplifier 3A (a low current C-Mos amplifier), a transistor 4A (reference 2 N3705), a programmable current source 7A (reference LM 334Z) and setting current resistors R1 and R2 indicated.

The amplifier 3A is operated in the "open-loop" mode and has, therefore, a high gain characteristic. When a voltage, such as a threshold voltage of greater than 2 mV is applied to the input terminals of the amplifier 3A, the amplifier is caused to saturate and turn the transistor 4A on. Thus, amplifier 3A compares the sensor output with a predetermined threshold level and provides a control signal to transistor 4A when the sensor output exceeds the threshold level. Transistor 4A then switches on to permit current from the current source to flow to the indicator 6A. The supply is then fed to the mercury indicator 6A and the current is limited by the programmable current source 7A and appropriately adjusted by the setting current resistors R1 and R2. The mercury indicator 6A thus displays the integral of current flowing therethrough over time.

As indicated previously the indicator 6 may be so modified that visual and/or audible warnings are given. To this end a subsidiary circuit may be incorporated which triggers a readable device. The readable display device may be an LED, an LCD or an electrochromic display. Alternatively the subsidiary circuit may actuate an audible alarm device. The display device receives the output current $I_o$ and thus the display will change as a function of the rate of drift of the thermocouple in response to the changes in $I_o$.

We claim:

1. Calibration warning apparatus for providing a warning when an electrical sensor requires recalibration, said sensor providing an electrical output signal over an elapsed time, comprising, said output signal varying in accordance with a sensed parameter:
   analogue driving circuit means adapted for receiving said electrical output signal from said electrical sensor and providing an analogue signal having a value corresponding thereto, said analogue signal value varying in accordance with said varying sensor output signal; and
   analogue indicating means for (a) receiving said analogue signal from said analogue driving circuit means, (b) integrating said analogue signal over the elapsed time said sensor is providing said output signal thus providing an integration value which is a function of both said varying analogue signal value and said elapsed time, and (c) providing a recalibration warning when said integration value exceeds a predetermined value.

2. Apparatus according to claim 1 wherein said electrical sensor comprises a thermocouple providing an output voltage.

3. Apparatus according to claim 2 wherein said driving circuit means includes amplifying means for generating an output signal dependent upon the thermocouple voltage, said amplifying means including a buffer amplifier coupled to said thermocouple.

4. Apparatus according to claim 3 wherein said amplifier means has linear and exponential gain characteristics for generating an output current $I_o$ which is dependent upon the thermocouple voltage $V_T$ according to the relationship:

$$I_o = ae^{bV}T$$

where a and b are constants.

5. Apparatus according to claim 1 wherein said analogue indicating means comprises a mercury indicator.

6. Apparatus according to claim 1 further including pre-settable clock means, operatable when the electrical output signal from said electrical sensor exceeds a predetermined value, for applying current to said analogue indicating means.

7. Apparatus according to claim 6 wherein said electrical sensor comprises a thermocouple.

8. Apparatus according to claim 7 wherein said analogue driving circuit means includes a high gain amplifier for receiving said analogue signal from said analogue driving circuit means, and a transmitter operable upon saturation of said amplifier, and means for limiting the value of the analogue signal applied to said analogue indicating means.

9. Apparatus according to claim 8 wherein said means for limiting comprises a programmable current source and setting resistors.

10. Calibration warning apparatus for providing a warning when an electrical thermocouple requires recalibration, said thermocouple providing an electrical output signal over an elapsed time period, said output signal having a voltage level, which varies in accordance with a sensed temperature, comprising:
    analogue driving circuit means adapted for receiving said electrical output signal from said thermocouple and providing an analogue signal having a value corresponding to the voltage level of said electrical output signal, said analogue signal value varying in accordance with said varying thermocouple voltage level; and
    analogue indicating means for (a) receiving said analogue signal value from said analogue driving circuit means, (b) integrating said analogue signal over the elapsed time to provide an integration value which is a function of both said varying thermocouple voltage level and said elapsed time, and (c) providing a recalibration warning when said integration value exceeds a predetermined value.

11. Apparatus according to claim 10 wherein said analogue indicating means provides a visual display indicating said integration value.

12. Calibration warning apparatus for providing a warning when an electrical thermocouple requires recalibration, said thermocouple providing an electrical output signal over an elapsed time period, said electrical output signal having a voltage level, comprising:
    analogue driving circuit means for producing an output signal, said driving circuit means including a buffer amplifier and amplifier means having linear and exponential gain for generating an output current $I_o$ which is dependent on said thermocouple voltage level $V_T$ according to the relationship:

$$I_o = ae^{bV}T$$

where a and b are constants; and analogue indicating means for (a) receiving said output signal from said analogue driving circuit means, (b) integrating said output signal over the elapsed time period thus providing an integration value which is a function of both said electrical output signal voltage level and said elapsed time period, and (c) providing a recalibration warning when said integration value exceeds a predetermined value.

13. Apparatus according to claim 12 wherein said analogue indicating means includes a mercury indicator.

14. Calibration warning apparatus for providing a warning when an electrical temperature sensor requires recalibration, said electrical temperature sensor providing an electrical output signal over an elapsed time period, said electrical output signal having a value which varies in accordance with sensed temperature, comprising:

linear amplifying means for receiving said electrical output signal from said electrical temperature sensor, and for producing a signal having a level proportional to the value of said electrical output signal, said signal level varying in accordance with said varying electrical output signal value; and indicating means for (a) receiving said signal from said linear amplifying means, (b) integrating said signal over the elapsed time period to provide an integration value corresponding to both said varying electrical output signal value and said elapsed time period, and (c) providing a recalibration warning when said integration value exceeds a predetermined value.

15. Apparatus according to claim 14 wherein said linear amplifying means includes means for producing an exponential signal corresponding to an exponential of said electrical sensor output signal.

16. Apparatus according to claim 14 wherein said indicating means comprises means for (a) producing a visual indication of said integration value, and (b) changing said visual indication as a function of a rate of drift of said electrical temperature sensor output from a predetermined calibrated output, said drift rate increasing with temperature.

17. Apparatus according to claim 14 wherein said indicating means includes:

a tube;

first and second columns of mercury disposed inside said tube;

a drop of electrolyte disposed in said tube and separating said first and second columns of mercury; and means for connecting said signal to one of said columns of mercury.

18. Apparatus according to claim 14 further including:

current source means for producing a current;

comparing means for producing a control signal when the value of said electrical output signal from said electrical temperature sensor exceeds a predetermined threshold level; and switching means of permitting said current produced by said current source means to flow through said indicating means in response to said control signal, whereby said indicating means indicates the integral of current flowing therethrough over said elapsed time period.

19. Apparatus according to claim 18 wherein said indicating means includes current limiting means for limiting the current flowing through said indicating means.

* * * * *